United States Patent [19]

Sakaemura

[11] Patent Number: 5,422,625
[45] Date of Patent: Jun. 6, 1995

[54] CONTROL SYSTEM FOR ENGINE SPEED METER

[75] Inventor: Masafumi Sakaemura, Shizuoka, Japan

[73] Assignee: Moriyama Kogyo Kabushiki Kaisha, Shichi, Japan

[21] Appl. No.: 48,475

[22] Filed: Apr. 16, 1993

[51] Int. Cl.6 ............................................. B60Q 1/00
[52] U.S. Cl. ................................... 340/461; 340/438; 340/439; 340/441; 340/459; 364/424.01; 364/424.03
[58] Field of Search ............... 340/438, 439, 441, 459, 340/461, 462; 364/424.01, 424.03

[56] References Cited

U.S. PATENT DOCUMENTS

| | | | |
|---|---|---|---|
| 4,188,618 | 2/1980 | Weisbert | 340/462 |
| 4,470,011 | 9/1984 | Masuda | 324/166 |
| 4,644,334 | 2/1987 | Yato et al. | 340/461 |
| 4,646,059 | 2/1987 | Iwamoto et al. | 340/461 |
| 4,788,539 | 11/1988 | Frey | 340/462 |
| 4,996,442 | 2/1991 | Wayne | 340/459 |
| 5,173,681 | 12/1992 | Schockley et al. | 340/441 |
| 5,269,187 | 12/1993 | Hanson | 340/439 |
| 5,293,154 | 3/1994 | Ginzel et al. | 340/459 |

Primary Examiner—John K. Peng
Assistant Examiner—Edward Lefkowitz
Attorney, Agent, or Firm—Knobbe, Martens, Olson & Bear

[57] ABSTRACT

A bar-type tachometer for indicating the speed of an engine and for providing a warning signal when the engine deviates from a predetermined, desired speed such as the desired idle speed>, In this way, even though the display covers a range of engine speeds, it is possible to establish a desired speed within that range, such as the setting of the actual desired idle speed.

31 Claims, 4 Drawing Sheets

No Indication

Usual Indication
(Without Flashing)

Flashing Indication

CONTROL SYSTEM FOR ENGINE SPEED METER

BACKGROUND OF THE INVENTION

This invention relates to a control system for an engine speed meter and more particularly to an improvement in bar-type speed displays.

In many types of machines, it is desirable to provide an indication of the speed at which the machine is operating. When the machine comprises an internal combustion engine that propels a vehicle such as a watercraft in addition to watercraft speed or in leu of it, it is very desirable to provide an indication of speed at which the engine is running. This permits the operator to insure that the engine is operating within its desired speed range and also at the optimum condition for fuel consumption. One type of speed indicator which has a great value is the bar-type speed indicator.

With a bar-type speed indicator, the display includes a plurality of segments each representative of a respective speed range of the engine. As the engine speed increases, an increasing number of the segments is illuminated so as to indicate the actual speed of the engine. Although this type of display is desirable, it has some disadvantages.

First, although the display indicates the engine speed, it is desirable to provide a warning indication when the engine speed is not at a desired speed. For example, it may be desirable to provide a display that indicates a warning when the engine speed is operating at below the desired engine speed and hence may approach a stalling condition.

It is, therefore, a principal object to this invention to provide an improved bar-type speed indicator with a warning system.

It is a further object to this invention to provide an improved and simplified warning arrangement for a bar-type speed display for indicating when the engine speed is not at a desired speed.

Another disadvantage with bar-type speed displays is because each segment is indicative of a speed range, it may be difficult for the operator to use the bar-type display to set an actual exact speed for the engine. For example, it is desirable to permit the operator to adjust the engine so as to establish the desired idle speed. However, when the speed display is of the bar-type, the idle speed is only a single speed within a range of one of the display elements. Hence, the operator cannot actually set the desired idle speed but can only set the speed within a certain range unless one of the extreme ends of the display range coincides with the desired engine speed.

It is therefore, a still further object to this invention to provide an improved bar-type tachometer that will permit the operator to set an exact engine speed.

It is a further object to this invention to provide a bar-type tachometer that will provide a display indicative of a certain exact engine speed.

SUMMARY OF THE INVENTION

A first feature of the invention is adapted to be embodied in a bar-type speed indicator for indicating the speed of the machine comprised of a bar-type display having a plurality of sections, each indicative of a segment of speed range of the machine. Speed sensing means are provided for sensing the speed of the machine and providing an output to the display. Means are provided for actuating the respective sections of the display in response to the output of the speed sensing means. Means provide a warning signal from the display when the speed sensed is other than a predetermined desired speed.

A further feature of this invention is adapted to be embodied in a bar-type speed indicator for indicating the speed of a machine and which is capable of indicating a desired actual engine speed. The display is comprised of a plurality of sections each indicating a segment of speed range of the machine. Speed sensing means are provided for sensing the speed of the machine and providing an output to the display. Means are provided for actuating the respective section in response to the output of the speed sensing means. Means are also provided for establishing a predetermined, desired speed and providing a flashing signal from the display when the engine speed is other than that predetermined, desired speed so that the operator may establish the predetermined, desired speed by changing the speed of the machine to eliminate the warning display.

DETAILED DESCRIPTION OF THE PREFERRED EMBODIMENT OF THE INVENTION

Figure 1:
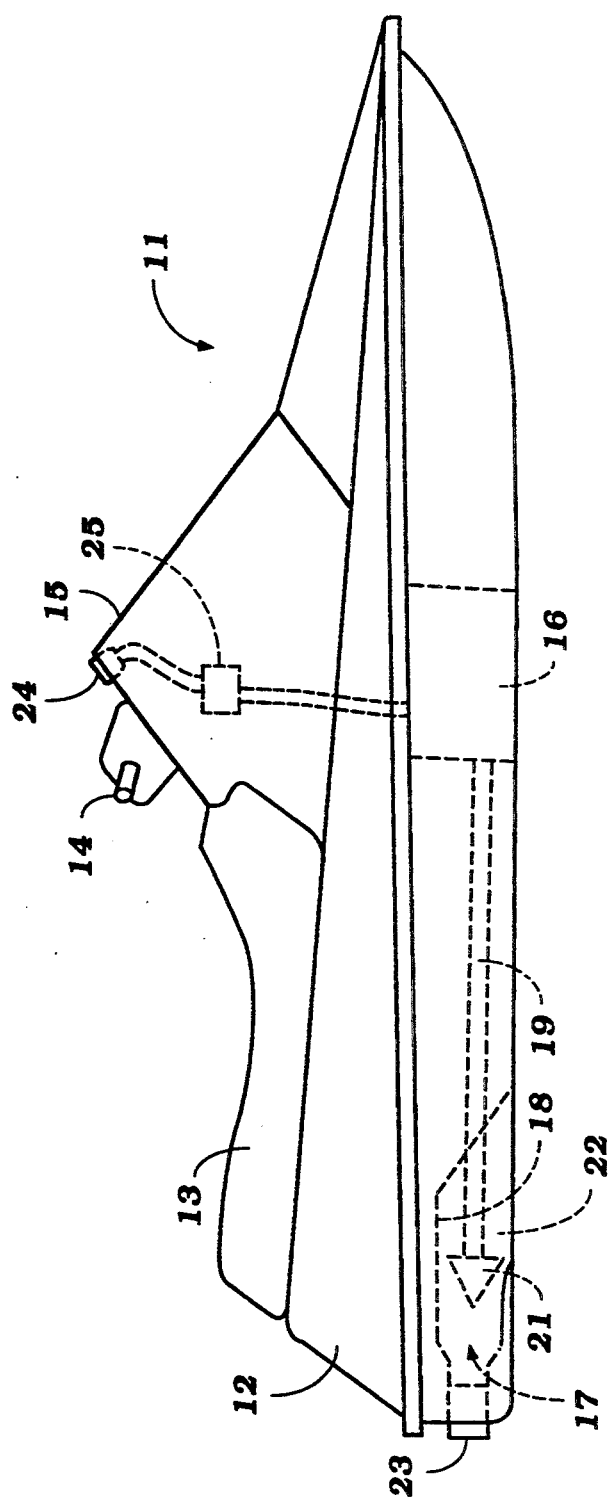
FIG. 1 is a side elevational view of a small watercraft constructed in accordance with an embodiment of the invention.

Referring now in detail to the drawings and initially to FIG. 1, a small watercraft incorporating the invention is identified generally by the reference numeral 11. The small watercraft 11 is depicted as being a typical environment in which the invention can be practiced. It is to be understood, however, that the invention is capable of use in a wide variety of other types of applications. However, the invention is directed primarily toward a device for indicating the speed of a machine, such as the speed of an internal combustion engine (tachometer) that is used to propel a vehicle. Of course, other applications for the invention will present themselves to those skilled in the art.

The watercraft 11 is a comprised of a hull 12 that provides a seat 13 that is adapted to accommodate one or more riders seated in straddle fashion. A control handle bar assembly 14 is positioned forwardly of the seat 13 on a control panel 15 which also overlies an engine compartment formed within the hull 12. The handle bar assembly 14 may include both engine speed control and steering control for the watercraft as well as any other desired control.

An internal combustion engine shown schematically at 16, is provided in the engine compartment beneath the control panel 15 and drives a jet propulsion unit, indicated generally by the reference numeral 17, positioned within a tunnel 18 formed in the rear of the hull 12 behind the engine 16. The engine 16 drives an output shaft 19 and impeller shaft on which an impeller 21 is affixed within the jet propulsion unit 17. Rotation of the impeller 21 will affect the drawing of water through a water inlet opening 22 and discharge of the water through a discharge nozzle 23, which may be pivotal about a vertically extending steering axis for steering of the watercraft 11 in well known manner.

The construction of the watercraft and the type of propulsion unit for it as thus far described, should be considered only as exemplary of an environment in which the invention can be practiced, as aforenoted.

In accordance with the invention, the watercraft 11 is provided with a display, indicated generally by the reference numeral 24 and which has a construction as best shown in the remaining figures. Before referring to those remaining figures, however, it should be further noted that the display 24 is operated by a control unit, shown schematically at 25 which receives signals from the engine 16. Included within the control unit 25 is a device that will receive signals from the engine ignition system and output a signal to the display 24, as will now become apparent by reference to the remaining figures and initially to FIG. 2.

Figure 2:
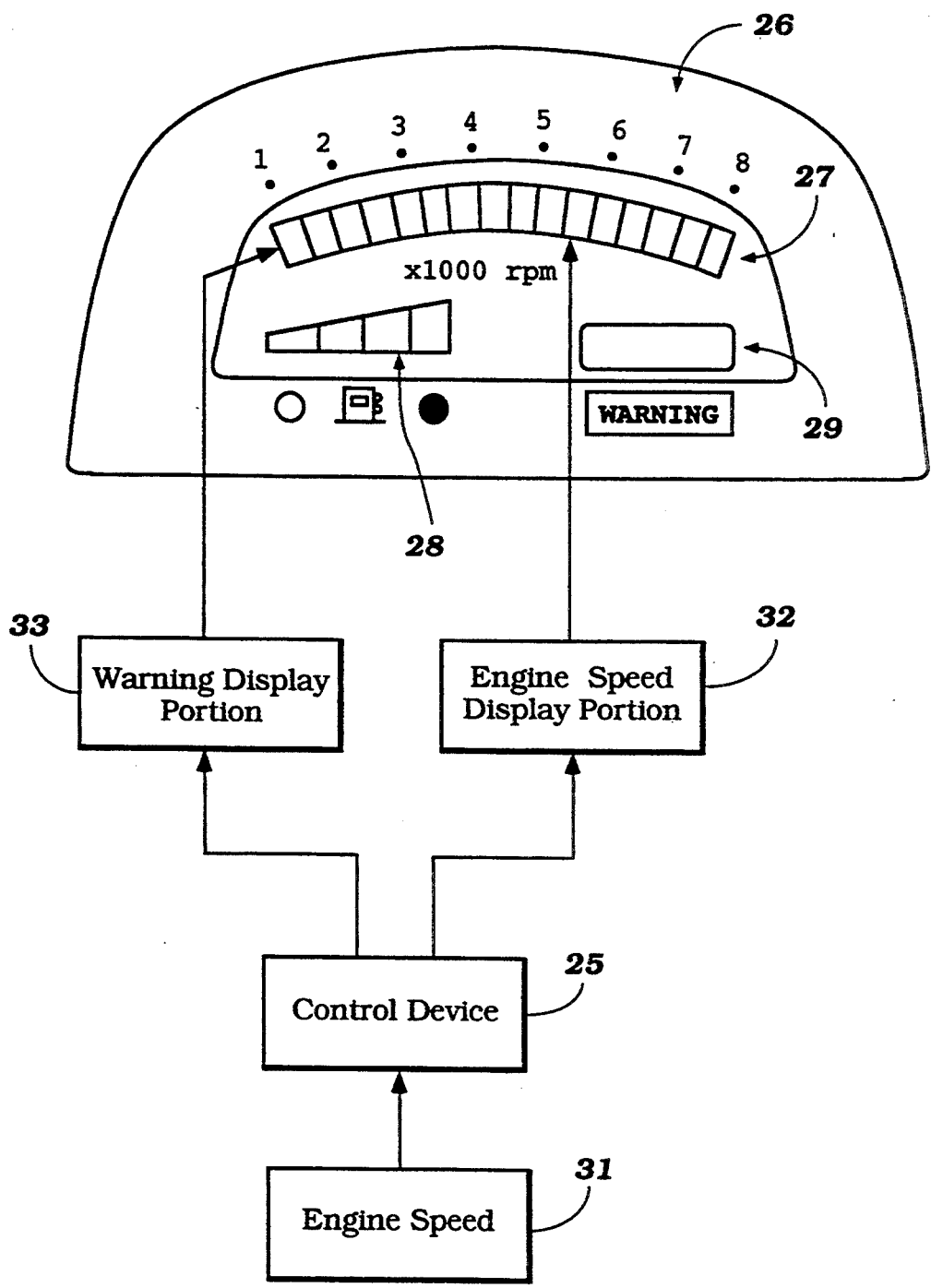
FIG. 2 is an enlarged view, partially in schematic form, showing the display of the watercraft.

As may be seen in FIG. 2, the display is comprised of a panel having a display area 26 on which a number of displays are provided including a bar-type tachometer 27, a graph-type fuel level display 28 and an engine temperature warning display 29. The invention deals primarily with the bar-type tachometer display 27 and only that portion of the display will be described in detail. It should be noted that the display 27 is comprised of a plurality of individual segments each of which is indicative of a range of engine speeds, for example 500 rpm with the first display being representative of engine speed between 1200 rpm and 1700 rpm. A suitable legend 31 is provided above the display so as to indicate engine speed in 1000 rpm increments.

The display 27 and specifically the segments thereof are operated by the system shown schematically in FIG. 2 which includes the box 31 which is indicative of engine speed, as aforenoted, and which may be derived from the engine ignition system. The control device 25, as aforenoted, receives the the engine speed signal 31 in an appropriate manner. The control device 25 outputs signals to a first segment 32 which comprises the engine speed display portion for driving the bar-type tachometer 27 in a manner which will be described. In addition, the control device 25 operates a warning display portion, indicated schematically at 33. The control routine will now be described by reference to FIG. 3 but before specifically describing that figure, the general theory of display will be described.

Basically the system operates so as to first assure that the engine is running at a speed that is sufficient to sustain its running. That is, it is insured initially that the engine is operating at a speed above the stall speed and if it does not operate above this speed, there is provided no indication at all from the display 27. Assuming, however, that the engine is running above the stall speed, then the display 27 is illuminated in the following manner. Assuming that the engine is operating at or above the desired idle speed, the display operates to illuminate the segments of the display 27 so as to indicate the actual speed of the engine. If, however, the engine is not running at the desired idle speed but rather is idling at a speed below the desired idling speed, then a warning signal is given. This permits the operator to adjust the speed of the engine so as to eliminate the warning indication and thus assure the desired idle speed even if it is a speed that falls within the range of the first display which, as has been noted, cover the range of 1200 to 1700 rpm.

Figure 3:
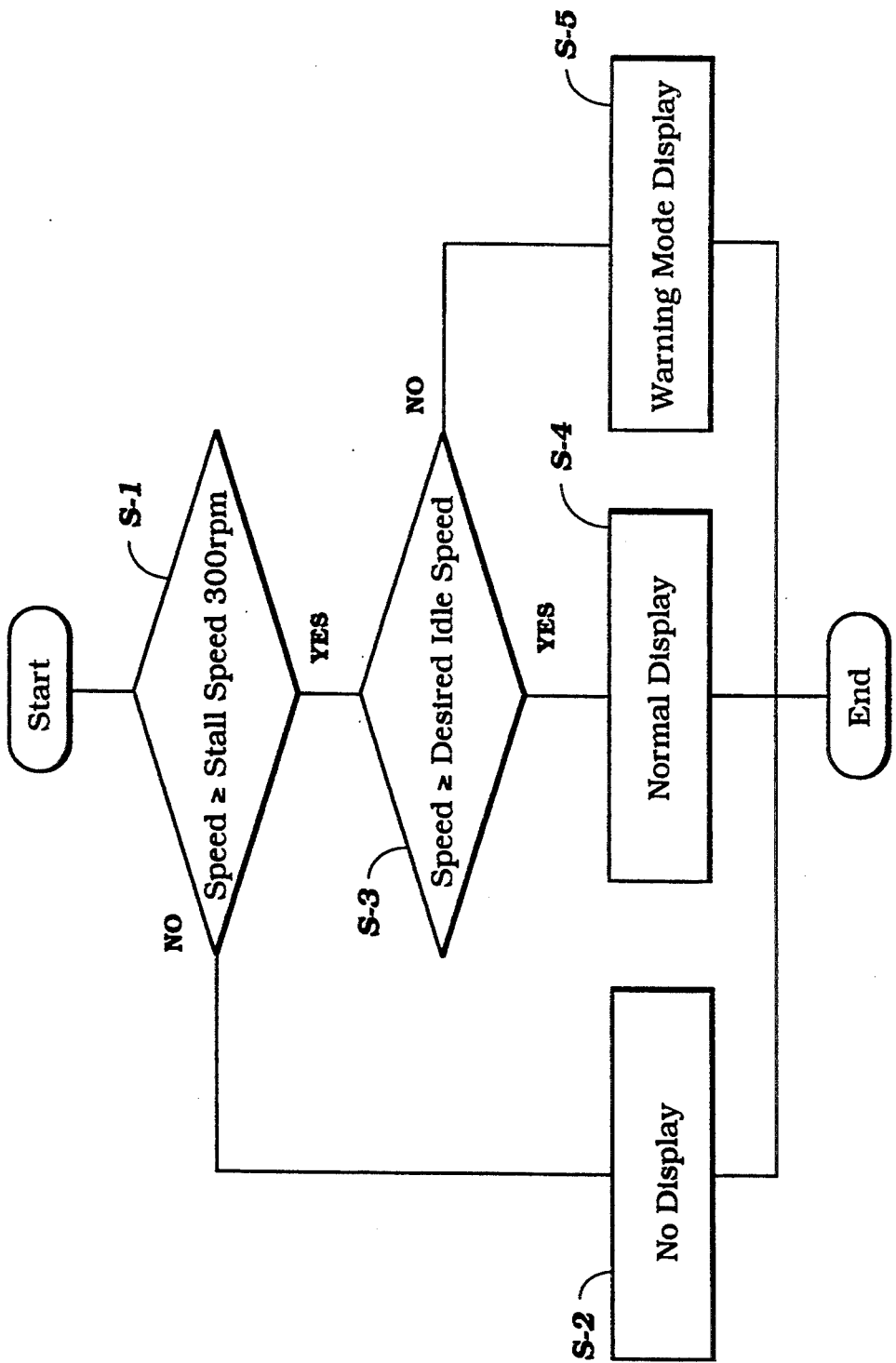
FIG. 3 is a block diagram showing the control routine for the engine speed display.
Figure 4:
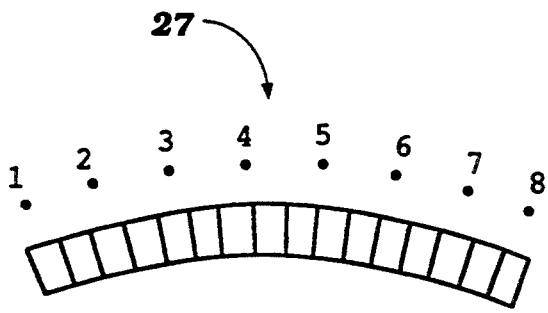
FIGS. 4, 5 and 6 are views showing the condition of the display, respectively when the engine speed is below a stalling speed, when the engine speed is in a normal range and when the engine is operating below the desired idle speed.

Referring now to FIG. 3, the program once it starts, moves the steps S-1 to determine if the engine speed is above the stall speed (for example, 300 rpm). The stall speed of the engine is the speed below which the engine will not be expected to continue to operate. If the engine speed at the step S-1 is determined to be below the stall speed, the program moves to the step S-2 and the display 27 is not illuminated as shown in FIG. 4.

Figure 5:
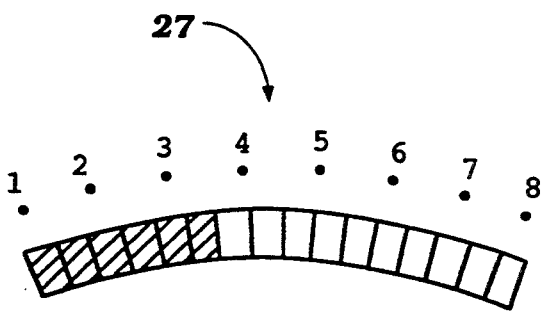

If at the step S-1 it has been determined that the engine is operating above the stall speed, the program then moves to the step S-3 to compare the engine speed with the desired engine idle speed. If the engine speed is determined at the step S-3 to be equal to or above the desired idle speed (for example, 1200 rpm), then the program moves to the step S-4 so as to provide the normal display (FIG. 5). Under this condition, the number of segments of the display 27 indicative of the engine speed will be illuminated. As has been previously noted, the sections are in 500 rpm increments and hence if the engine speed is at 2000 rpm, the number of segments indicative of this speed will be illuminated even though that segment includes a speed range greater than 2000 rpm.

Figure 6:
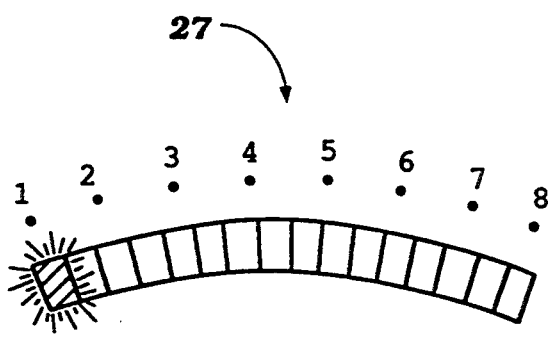

If, however, at the step S-3 it is determined that the engine speed is below the desired idle speed, the program then moves to the warning mode, step S-5 to provide a display as shown in FIG. 6. In this condition, the operator is warned that the engine speed is below the idle speed by flashing one or more of the segments. In the illustrated embodiment, the segment containing the actual desired engine idle speed is flashed as such a warning indication. Thus, the operator knows that the engine is being operated at a speed less than the desired idle speed and one which may cause stalling and he can adjust the engine to bring the speed up to the desired idle speed. As has been previously noted, this is easily done by adjusting the engine until the warning display mode of FIG. 6 ceases and the normal engine speed display mode of FIG. 5 resumes. Thus, even though the desired engine idle speed may be within the range of one of the segments, the actual speed can be readily adjusted.

It should be readily apparent from the foregoing description that the described system is extremely effective in providing an easy bar-type of tachometer display and yet one which does permit deviation from a desired engine speed such as the idle speed. Of course, this feature can also be employed to indicate other specific speeds if that is what is desired. Various other changes and modifications may be made without departing from the spirit and scope of the invention, as defined by the appended claims.

I claim:

1. A bar-type speed indicator for indicating the speed of a machine comprising a bar-type of display having a plurality of sections each indicating a specific segment of speed range of said machine, speed sensing means for sensing the speed of said machine and providing an output to said display, means for actuating the section representing the speed of the machine in response to the output signal of said speed sensing means when the detected speed falls within the range of that respective section, and means providing a warning signal from at least one of said sections when the speed sensed is other than a specific speed.

2. A bar-type speed indicator as set forth in claim 1 wherein the machine comprises an engine and if the engine speed is at a speed represented by one of the sections but is below a speed at which the engine cannot continue to operate without eventually stalling, said one section is not displayed.

3. A bar-type speed indicator as set forth in claim 2 wherein the specific speed comprises the idle speed of the engine.

4. A bar-type speed indicator as set forth in claim 3 wherein the warning signal is providing by the section of the display that represents the speed range that encompasses the idle speed.

5. A bar-type speed indicator as set forth in claim 4 wherein the warning signal is provided by flashing the section that represents the speed range that encompasses the idle speed.

6. A bar-type speed indicator as set forth in claim 1 wherein the warning display is provided by flashing at least one of the sections.

7. A bar-type speed indicator as set forth in claim 6 wherein the flashing of the one section is provided when the speed is below the specific speed.

8. A bar-type speed indicator as set forth in claim 7 wherein the machine is an engine and if the engine speed is at a speed represented by one of the sections but is below a speed at which the engine cannot continue to operate without eventually stalling, said one section is not displayed.

9. A bar-type speed indicator as set forth in claim 8 wherein the specific speed of the engine is the idle speed.

10. A bar-type speed indicator as set forth in claim 9 wherein if the engine speed is above the stalling speed but below the idle speed providing the warning display but if the engine is equal to or above the idle speed, providing the normal speed display.

11. A bar-type speed indicator as set forth in claim 1 wherein the warning signal is provided by flashing the section of the display which includes in its display range the specific speed.

12. A bar-type speed indicator as set forth in claim 11 wherein only the section representing the specific speed is flashed.

13. A bar-type speed indicator as set forth in claim 12 wherein the machine comprises an engine and the specific speed is the idle speed.

14. A bar-type speed indicator as set forth in claim 13 further including if the engine speed is at a speed represented by one of the sections but is below a speed at which the engine cannot continue to operate without stalling, said one section is not displayed.

15. A method of setting a specific speed for an engine having a bar-type speed indicator for indicating the speed of the engine comprising a bar-type of display having a plurality of sections each indicating a specific segment of speed range of the engine, speed sensing means for sensing the speed of said engine and providing an output signal, said method comprising the steps of actuating at least the display section representing the range including the sensed engine speed in response to the output of the speed sensing means unless the engine speed is other than a specific speed, if the speed is other than the specific speed then flashing the display of at least one section until the engine speed is adjusted to the specific engine speed.

16. A method of setting a specific speed for an engine as set forth in claim 15 wherein the specific engine speed is the idle speed and the display is flashed when the idle speed is less than the specific engine speed.

17. A method of setting a specific speed for an engine as set forth in claim 16 wherein the display flashed is the section that represents the range including the idle speed.

18. A bar-type speed indicator for indicating the speed of a machine comprising a bar-type of display having a plurality of sections each indicating a specific segment of speed range of said machine, speed sensing means for sensing the speed of said machine and providing an output to said display, means for actuating the respective section representing the speed of the machine and all sections representing speeds lower than the detected speed in response to the output signal of said speed sensing means when the detected speed falls within the range of that respective section, and means providing a warning signal from at least one of said sections when the speed sensed is other than a specific speed.

19. A bar-type speed indicator as set forth in claim 18 wherein the machine comprises an engine and further including if the engine speed is at a speed represented by one of the sections but is below a speed at which the engine cannot continue to operate without eventually stalling, said one section is not displayed.

20. A bar-type speed indicator as set forth in claim 19 wherein the specific speed comprises the idle speed of the engine.

21. A bar-type speed indicator as set forth in claim 20 wherein the warning signal is provided by the section of the display that represents the speed range that encompasses the idle speed.

22. A bar-type speed indicator as set forth in claim 21 wherein the warning signal is provided by flashing the section that represents the speed range that encompasses the idle speed.

23. A bar-type speed indicator as set forth in claim 18 wherein the warning display is provided by flashing at least one of the sections.

24. A bar-type speed indicator as set forth in claim 23 wherein the flashing of the one section is provided when the speed is below the specific speed.

25. A bar-type speed indicator as set forth in claim 24 wherein the machine is an engine and further including if the engine speed is at a speed represented by one of the sections but is below a speed at which the engine cannot continue to operate without eventually stalling, said one section is not displayed.

26. A bar-type speed indicator as set forth in claim 25 wherein the specific speed is the idle speed of the engine.

27. A bar-type speed indicator as set forth in claim 26 wherein if the engine speed is above the stalling speed but below the idle speed providing the warning display but if the engine is equal to or above the idle speed, providing the normal speed display.

28. A bar-type speed indicator as set forth in claim 18 wherein the warning signal is provided by flashing the section of the display which includes in its display range the specific speed.

29. A bar-type speed indicator as set forth in claim 28 wherein only the section representing the specific speed is flashed.

30. A bar-type speed indicator as set forth in claim 29 wherein the machine comprises an engine and the specific speed is the idle speed.

31. A bar-type speed indicator as set forth in claim 30 further including if the engine speed is at a speed represented by one of the sections but is below a speed at which the engine cannot continue to operate without stalling, said one section is not displayed.

* * * * *